United States Patent [19]

Shuman

[11] Patent Number: 5,562,933

[45] Date of Patent: Oct. 8, 1996

[54] ADJUSTABLE CLAMPING FRAME

[76] Inventor: Jack N. Shuman, 3330 Foxcroft Rd., Charlotte, N.C. 28211

[21] Appl. No.: 391,112

[22] Filed: Feb. 21, 1995

[51] Int. Cl.$^6$ .................................................. B29C 51/26
[52] U.S. Cl. ........................... 425/388; 269/119; 269/121; 425/DIG. 48
[58] Field of Search ........................... 425/DIG. 48, 388, 425/397; 269/119, 121, 142, 170, 111, 118, 120

[56] References Cited

U.S. PATENT DOCUMENTS

| | | | |
|---|---|---|---|
| 2,836,852 | 6/1958 | Butzko | 425/253 |
| 3,133,314 | 5/1964 | Arnould et al. | 425/388 |
| 3,287,765 | 11/1966 | Puente | 425/DIG. 48 |
| 3,599,959 | 8/1971 | Asenbauer | 269/111 |
| 3,600,746 | 8/1971 | Kostur et al. | 269/119 |
| 3,661,486 | 5/1972 | MacDonald | 425/397 |
| 3,827,683 | 8/1974 | Seborg et al. | 425/397 |
| 3,841,819 | 10/1974 | Diamond | 425/388 |
| 3,910,747 | 10/1975 | Dean et al. | 425/DIG. 48 |
| 3,960,471 | 6/1976 | Medendorp | 425/388 |
| 4,009,981 | 3/1977 | Rosen | 425/388 |
| 4,018,551 | 4/1977 | Shuman | 425/388 |
| 4,938,678 | 7/1990 | Oulman | 425/DIG. 48 |

FOREIGN PATENT DOCUMENTS 1467425   3/1977   United Kingdom .................. 425/397

OTHER PUBLICATIONS

Photographs of prior art machine, Shuman Company, Charlotte, NC (No date).

*Primary Examiner*—Robert Davis
*Attorney, Agent, or Firm*—Shefte, Pinckney & Sawyer

[57] ABSTRACT

An adjustable clamping frame used in a vacuum forming machine comprising two longitudinal frame members disposed in spaced parallel relation to one another and two transverse frame members disposed in spaced parallel relation to one another. The two longitudinal frame members are perpendicular to the two transverse frame members. The longitudinal frame members have elongated slots for receiving the opposite ends of the two transverse frame members. The elongated slots permit selective sliding movement of the transverse frame members within the longitudinal frame members for varying the spacing between the transverse frame members in order to accommodate varying sizes of plastic sheets to be molded. The elongated slots also permit removal of each transverse frame member by rotation of each transverse frame member out of the elongated slots of the longitudinal frame members.

15 Claims, 5 Drawing Sheets

ADJUSTABLE CLAMPING FRAME

BACKGROUND OF THE INVENTION

This invention relates to clamping frames used in vacuum forming machines, and more particularly, to adjustable clamping frames for accommodating varying sizes of plastic sheets to be molded in a vacuum forming machine.

Vacuum forming machines are used in manufacturing plastic signs and the like by draping a heated plastic sheet over a die. The die is perforated, and a vacuum is applied in the interior of the die for conforming by suction the heated plastic sheet to the exact contours of the die. Generally, a clamping frame is used in a vacuum forming machine for securing the plastic sheet to be molded, advancing the plastic sheet to a heat source for plasticizing of the plastic sheet, and then draping or pulling the plastic sheet over the die.

Clamping frames for accommodating various sizes of plastic sheets are not new in the art, and are disclosed, for example, in U.S. Pat. No. 3,133,314, issued May 19, 1964, to Arnould et al., in U.S. Pat. No. 3,841,819, issued Oct. 15, 1974, to Diamond, in U.S. Pat. No. 3,599,959, issued Aug. 17, 1971, to Asenbauer, and in U.S. Pat. No. 4,018,551, issued Apr. 19, 1977, to Shuman.

Also known in the prior art is an adjustable frame structure that has two longitudinal frame members disposed in spaced parallel relation to one another and two transverse frame members disposed in spaced parallel relation to one another. Each of the frame members has clamps secured to it for clamping sheets of plastic to be molded. Each of the two longitudinal frame members has multiple openings extending therethrough longitudinally along the length of the longitudinal frame members, the openings conforming to the cross-sectional shape of the transverse frame members for receiving, retaining, and supporting the transverse frame members.

Because the transverse frame members extend through and rest in the openings of the longitudinal frame members, the longitudinal frame members are free to slide down the transverse length of the transverse frame members, provided any clamps are removed that might inhibit the sliding of the transverse frame member through a longitudinal frame member. The sliding of the longitudinal frame members along the transverse frame members varies the distance between longitudinal frame members and allows the adjustable frame structure to accommodate a variety of sizes of plastic sheets to be molded. Furthermore, because of the multiple openings extending longitudinally along the length of the longitudinal frame members, the transverse frame members can be inserted into openings at varying distances between the two transverse frame members, thereby allowing the adjustable frame structure to accommodate an even greater variety of sizes of plastic sheets to be molded. Of course, to vary the distance between the transverse frame members, the longitudinal frame members must be separated by a distance greater than the transverse length of the transverse frame members in order to remove the ends of a transverse frame member from its current openings.

SUMMARY OF THE INVENTION

The present invention comprises a frame structure that accommodates various sizes of plastic sheets, but that has a unique construction that is more efficient to use and economical to manufacture than the adjustable frame structures of the prior art.

Briefly described, the present invention comprises a pair of longitudinal frame members disposed in spaced parallel relation to one another, each said longitudinal frame members having at least one elongated slot extending therethrough longitudinally along the length thereof. Each of the longitudinal frame members supports clamps for clamping plastic sheets to be molded in a vacuum forming machine.

The invention also includes a pair of transverse frame members disposed in spaced parallel relation to one another and substantially perpendicular to said longitudinal frame members. The transverse frame members also support clamps for clamping plastic sheets to be molded in a vacuum forming machine. At least one of the transverse frame members has opposite ends that are slidably disposed through the elongated slots of the longitudinal frame members for supporting the one transverse frame member and for permitting selective sliding movement of the one transverse frame member for varying the spacing between the transverse frame members.

In one embodiment of the present invention, the one transverse frame member comprises two transverse beams, and a further feature includes means for disposing the transverse beams in spaced parallel relation to one another.

A further feature of the present invention includes track guides attached to each longitudinal frame member, and a clamping frame support structure for securing the adjustable clamping frame to the vacuum forming machine, with the clamping frame support structure having channels extending parallel to the transverse frame members for receiving and retaining the track guides. When the longitudinal frame members are slidably secured to the clamping frame support structure by retention of the track guides within the channels, the longitudinal frame members are slidably moveable in a direction parallel to the transverse frame members. A further feature of the present invention includes means on the track guides for securing the longitudinal frame members in a fixed position with respect to the clamping frame support structure.

In another embodiment of the present invention, at least one transverse frame member can be removed from the clamping frame by rotation of the one transverse frame member about one of its ends without necessarily having to move either of the longitudinal frame members.

Another feature of the present invention includes clamp support members for supporting the clamps of the transverse frame members in a common plane with the clamps of the longitudinal frame members. In an embodiment of the present invention, the clamp support members are slidably attached to the transverse frame members.

In another embodiment of the present invention, two transverse frame members have opposite ends that are slidably disposed through the elongated slots of the longitudinal frame members for supporting the transverse frame members and for permitting selective sliding movement of the transverse frame members. In yet another embodiment of the present invention, two transverse frame members have opposite ends that are slidably disposed in separate elongated slots.

Another feature of the present invention includes means adjacent at least one opposite end of one transverse frame member for securing the one transverse frame member in a fixed longitudinal position relative to the longitudinal frame members.

In one embodiment of the invention, the securing means comprises means slidably attached to one transverse frame member for selective gripping engagement with opposite sides of one longitudinal frame member, thereby preventing sliding movement of the transverse frame member longitudinally within an elongated slot of one longitudinal frame member.

In a further embodiment of the present invention, the securing means comprises two plates slidably attached to one of the transverse frame members at opposite sides of one of the longitudinal frame members, and means for urging the plates towards one another to sandwich the longitudinal frame member between the plates. In yet a further embodiment, the urging means comprises a fastener extending between the plates for selectively exerting a compressive force to urge the plates into the longitudinal frame member.

In another embodiment of the invention, one of the transverse frame members comprises two transverse beams, and the plates of the securing means exhibits two openings for receiving the transverse frame member therethrough with the plates disposing the two transverse beams in fixed parallel relation to one another.

BRIEF DESCRIPTION OF THE DRAWINGS

Further objects, features, and advantages of this invention will become apparent from a consideration of the accompanying detailed description and the following drawings, in which.

DETAILED DESCRIPTION OF THE PREFERRED EMBODIMENT

With reference to the drawings, the preferred embodiment of the present invention will now be described in detail.

Figure 1:
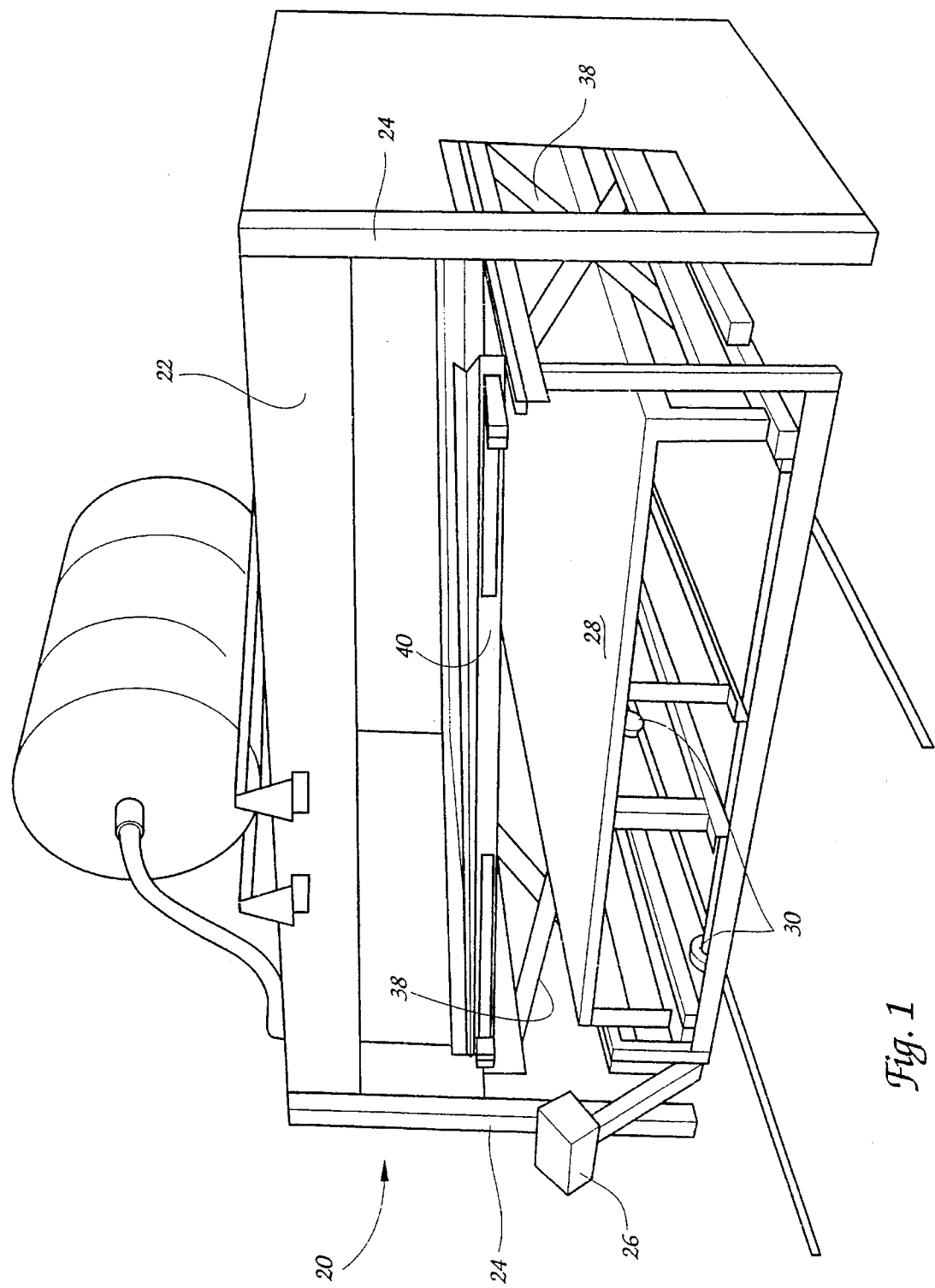
FIG. 1 is a perspective view of a vacuum forming machine having an adjustable clamping frame according to the preferred embodiment of the present invention.

Referring now in greater detail to the accompanying drawings, FIG. 1 illustrates an apparatus for forming plastic material, known as a vacuum forming machine generally indicated by the reference number 20, comprising a heating oven 22 supported at an elevated position by vertical legs 24, the bottom side of the heating oven 22 including a plurality of heating panels (not shown) operated by a control unit 26 to energize all or selected ones of the heating panels.

Figure 2:
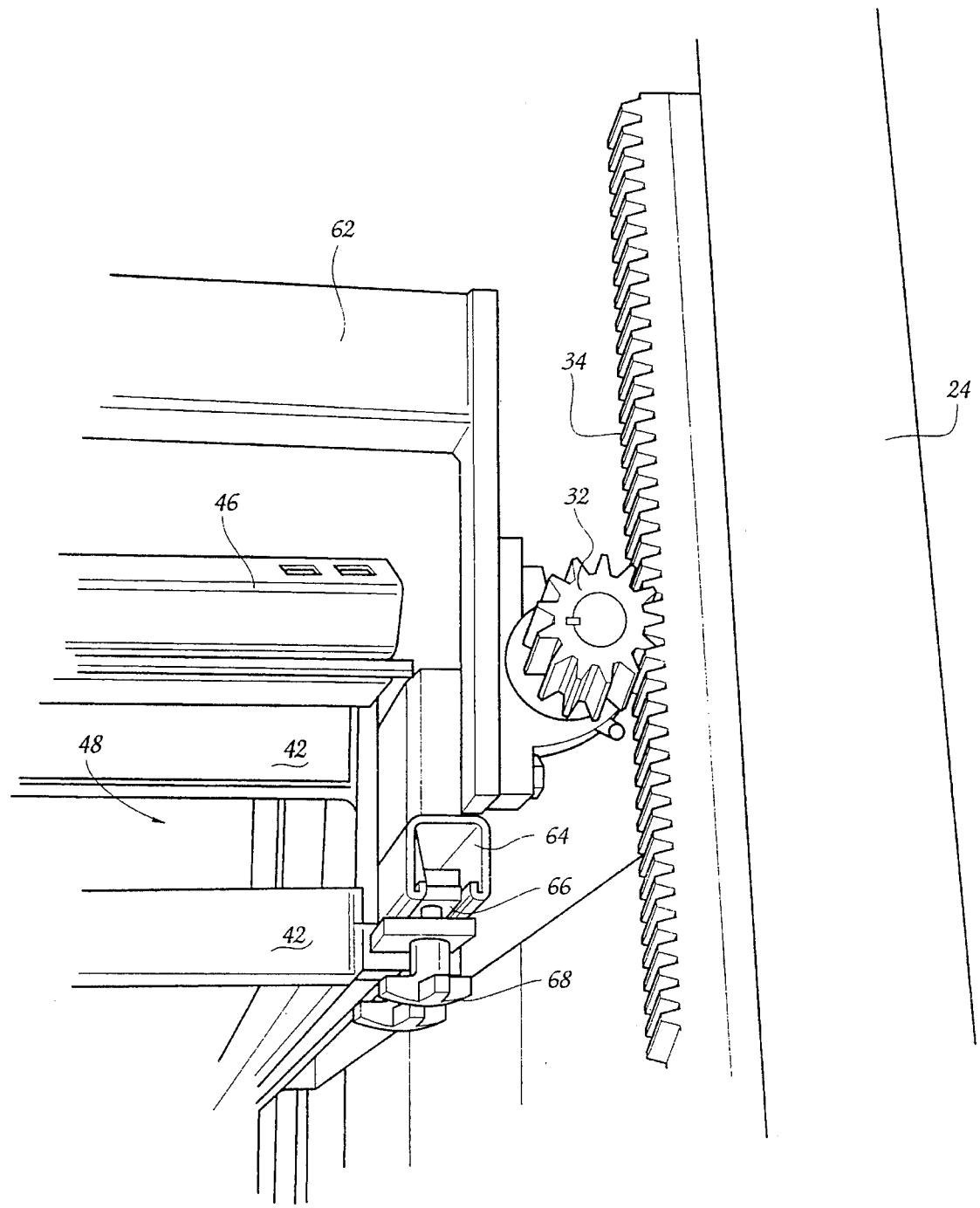
FIG. 2 is an enlarged perspective view of the adjustable clamping frame of FIG. 1, taken at one corner thereof, supported by an alternative means for raising and lowering the clamping frame.

A forming table 28 may be supported on track mounted casters 30 to permit the forming table 28 to be rolled from a position directly beneath the heating oven 22 to a position displaced forwardly therefrom at which a forming mold and plastic sheet to be formed can be mounted on the forming table 28. The forming table 28 includes a rectangularly shaped clamping frame support structure 62 supported for vertical movement by a scissor-type linkage 38 to raise and lower the clamping frame 40, toward and away from the heating oven 22, as shown in FIG. 1. Alternatively, as shown in FIG. 2, the clamping frame support structure 62 may be supported on the upstanding legs 24 of the oven 22 by meshing engagement of a pinion gear 32 at each corner of the clamping frame support structure 62 with a toothed rack 34 affixed to the legs 24 for vertical movement of the clamping frame support structure 62 by driving of the pinion gears 32 through a control motor (not shown).

In either case, the forming table 28 is adapted to support a forming mold (not shown) of a predetermined desired configuration, while the clamping frame 40 is adapted, as described more fully hereinafter, to grip the lateral edges of a rectangular sheet of thermoplastic material. In basic operation, the clamping frame 40 is raised by clamping frame support structure 62 to a location beneath the oven 22 to heat the thermoplastic sheet to a plasticized moldable state, after which the frame 40 is lowered to place the plasticize sheet over the forming mold while a vacuum or suction force is applied within the mold to draw the sheet into conformity to the mold, all as is basically conventional. The present invention concerns a novel structure of the clamping frame by which it can be readily adjusted to a variety of differing rectangular configurations and dimensions for use to readily mold plastic sheets into a variety of differing shapes and sizes.

The clamping frame 40 of the vacuum forming machine 20 consists of two longitudinal frame members 42 and two transverse frame members 44. The two longitudinal frame members 42 are disposed in spaced parallel relation to one another, and the two transverse frame members 44 are disposed in spaced parallel relation to one another. The longitudinal frame members 42 and the transverse frame members 44 are perpendicular to each other. Both the longitudinal frame members 42 and the transverse frame members 44 support clamps 46 for clamping plastic sheets to be molded. Each of transverse frame members 44 comprises two transverse beams 45, shown in FIG. 3.

Figure 5:
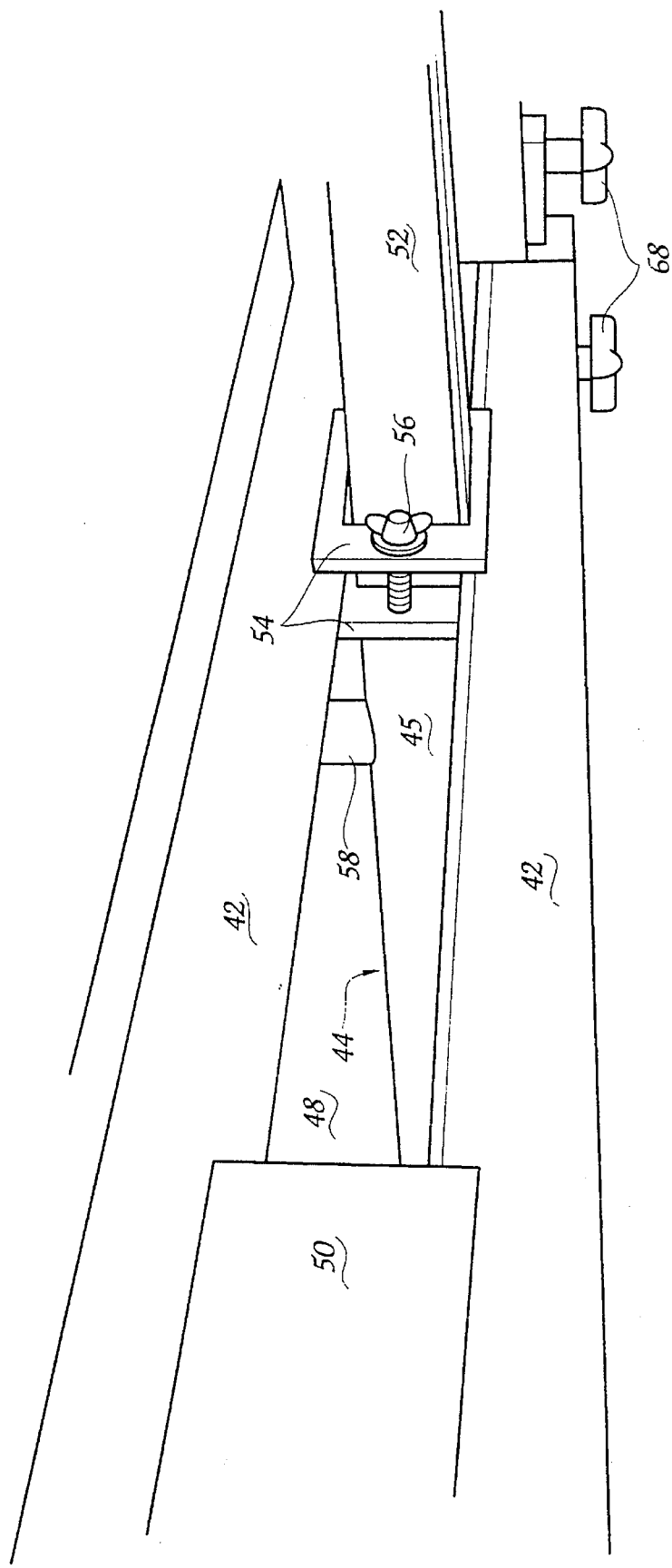
FIG. 5 is an enlarged perspective view of the longitudinal frame member of FIGS. 2–4 showing the elongated slot thereof.

The longitudinal frame members 42 have two elongated slots 48 that extend through the longitudinal frame members 42 and extend longitudinally along the length of the longitudinal frame members 42. As shown in FIG. 5, one elongated slot 48 extends what is approximately one-half the length of the longitudinal frame member 42. A support plate 50 is welded to the longitudinal frame member 42 adjacent the center portion of the longitudinal frame member 42 to reinforce the strength of the longitudinal frame member 42. An elongated slot similar to the elongated slot 48 shown in FIG. 5 extends from the support plate 50 to the other end of the longitudinal frame member 42, with the other end of the longitudinal frame member 42 mirroring the part of the longitudinal frame member 42 specifically shown in FIG. 5.

Figure 3:
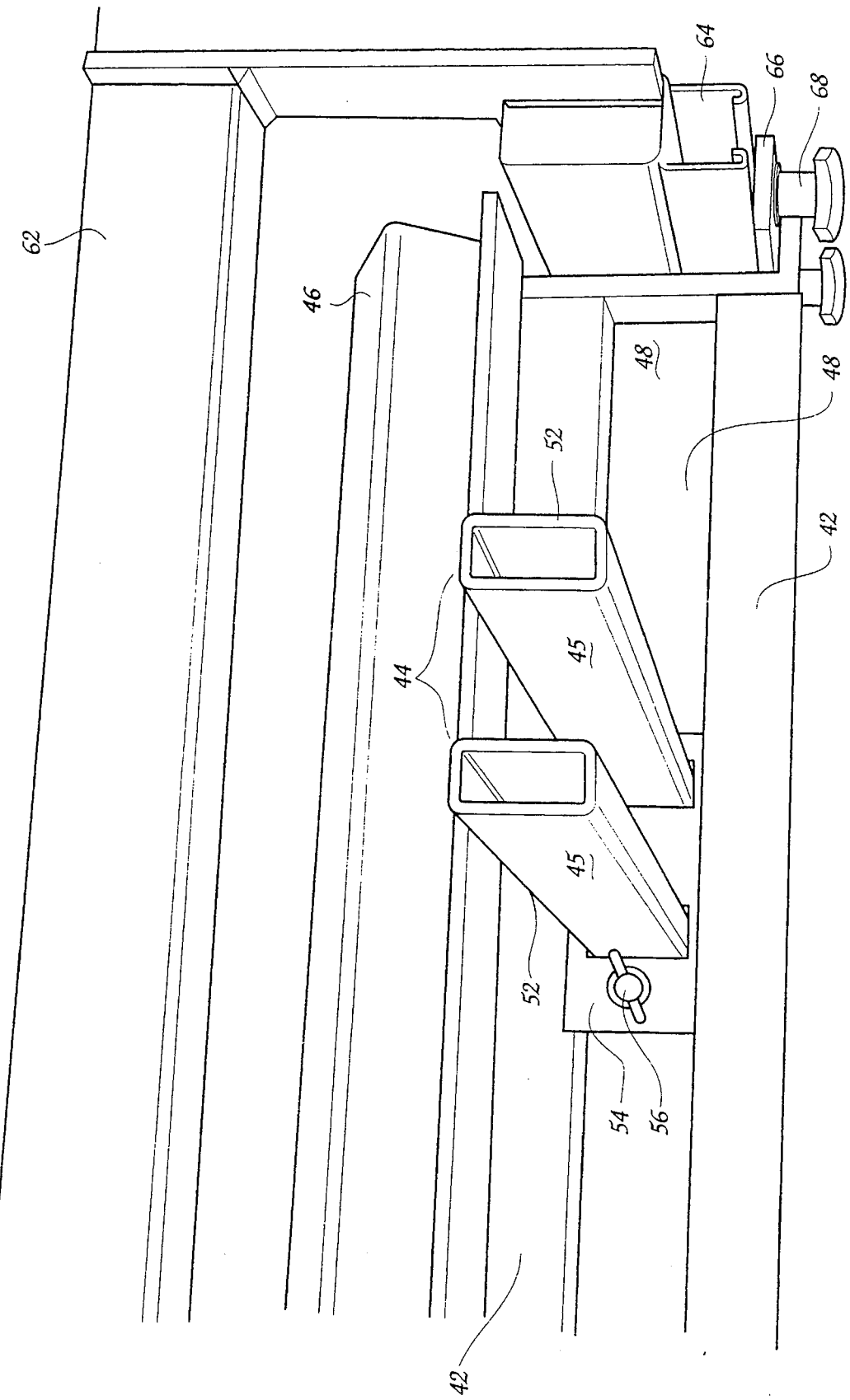
FIG. 3 is another enlarged perspective view of the adjustable clamping frame of FIG. 1, illustrating the sliding connection between one longitudinal frame member and one transverse frame member.

The transverse frame member 44 has opposite ends that extend through the elongated slots of the longitudinal frame members. For example, as shown in FIG. 5, end 52 of transverse frame member 44 extends through the elongated slot 48 of longitudinal frame member 42. The transverse frame member 44 consists of two transverse beams held in a parallel spaced relation to one another by plates 54, as shown in FIG. 3.

The plates 54 slide freely on the transverse frame members as well as one the longitudinal frame members when not under compressive force exerted by fastener 56 shown in FIG. 5. When fastener 56 exerts a compressive force, plates 54 sandwich longitudinal frame member 42, gripping longitudinal frame member 42, and securing transverse frame member 44 in a fixed longitudinal position relative to the longitudinal frame member. It is contemplated that the fastener may be a bolt and nut combination as shown in FIG. 5, but any other type fastener providing selective compressive force urging plates 54 into gripping contact with longitudinal frame member 42 is suitable.

Figure 4:
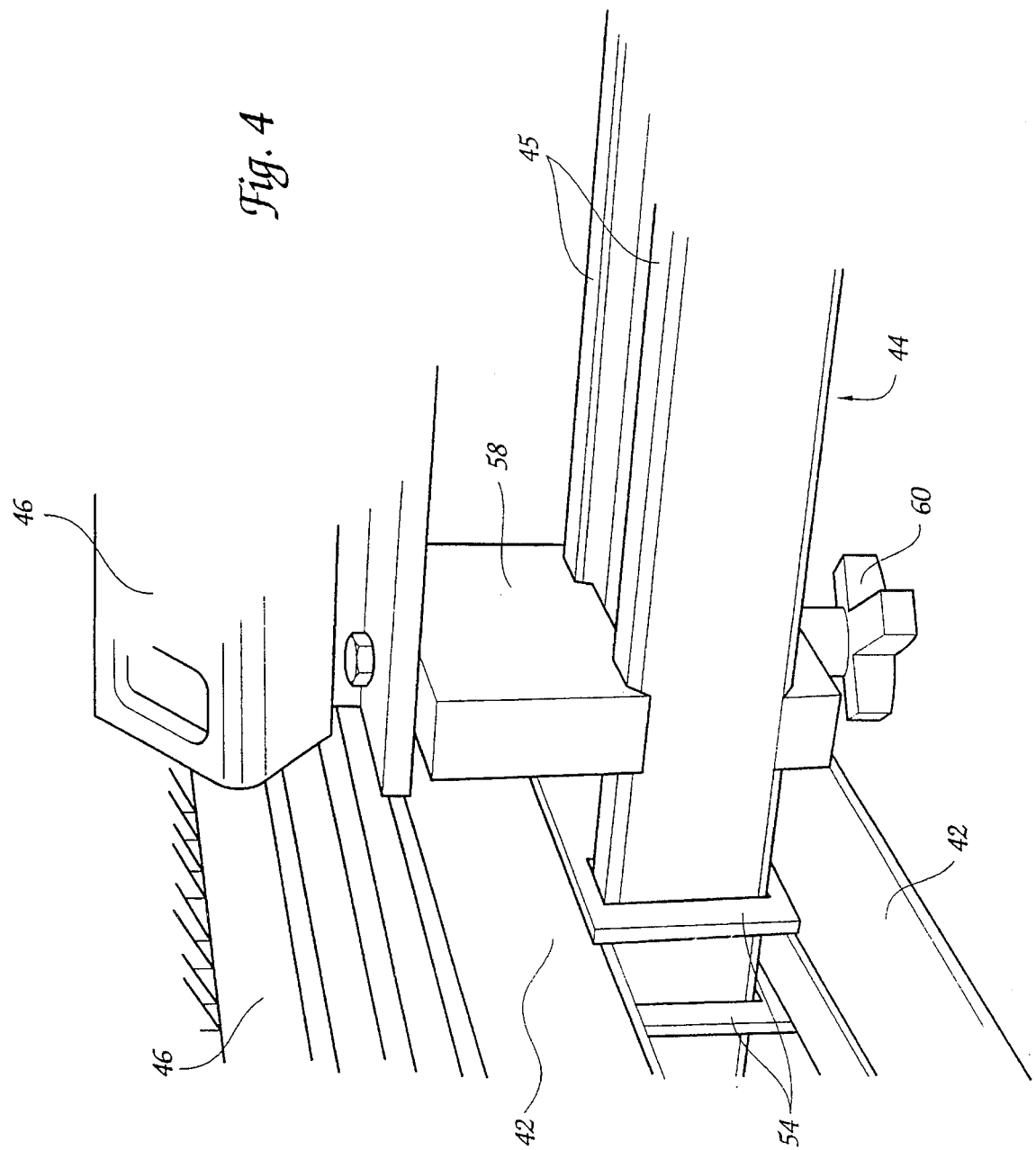
FIG. 4 is another enlarged perspective view of the adjustable clamping frame showing the sliding connection of FIG. 3 from the opposite side of the longitudinal frame member.

The clamps 46 on transverse frame member 44 are slidably supported by clamp support members 58, as shown in FIG. 4. When fastener 60 is tightened, clamp support member 58 will not slide along transverse member 44. On the other hand, when fastener 60 is loosened, clamp support member 58 will freely slide along transverse member 44. Clamp support members 58 also support clamps 46 on transverse frame member 44 in a common plane with the clamps 46 on longitudinal frame member 42, as shown in FIG. 4.

The adjustable clamping frame of the present invention described above is attached to the vacuum forming machine 20 by way of a clamping frame support structure 62, as shown in FIG. 2. Clamping frame support structure 62 has channels 64 that receive tack guides 66 attached to longitudinal frame members 42, also shown in FIG. 2. Fasteners 68 on track guides 66 operate in the same fashion as fasteners 60 on the clamp support members 58. When fasteners 68 are loosened, longitudinal frame member 42 can freely slide in a direction parallel to transverse frame members 44. When tightened, longitudinal frame member 42 is secured in a fixed position relative to clamping frame support structure 62.

One benefit of the present invention is that a wide variety of sizes of plastic sheets can be molded using the adjustable clamping frame of the present invention. Not only can the longitudinal frame members 42 be moved by sliding to accommodate varying sizes of plastic sheets, but transverse frame members 44 can also be moved by sliding to accommodate varying sizes of plastic sheets. Furthermore, both longitudinal and transverse frame members can be moved with little difficulty since transverse frame members do not need to be removed from an opening and then reinserted into a new opening, as is required in the prior art. This saves considerable time in preparing for differing sizes of plastic sheets.

Another benefit of the present invention is that transverse frame members can be easily removed or installed in the clamping frame without necessarily having to move longitudinal frame members. In the preferred embodiment of the present invention shown in the drawings, by rotating transverse frame member 44 in FIG. 3, i.e., by sliding end 52 of transverse frame member 44 about its opposite end (not shown), end 52 of transverse frame member 44 will slidably rotate out of elongated slot 48 and thus, transverse frame member 44 can be easily removed without necessarily moving longitudinal frame member 42. Of course, depending upon the spacing between the longitudinal frame members, longitudinal frame member 42 may need to be moved away from the other longitudinal frame member; however, in the present invention, this is not always the case. Also, plates 54 will have to be removed, if used in practicing the invention.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended nor should be construed to limit the present invention or otherwise to exclude any such other embodiments, adaptations, variations, modifications and equivalent arrangements, the present invention being limited only by the claims appended hereto and the equivalents thereof.

I claim:

1. An adjustable clamping frame for use in a vacuum forming machine, comprising:

a pair of longitudinal frame members disposed in spaced parallel relation to one another, each of said longitudinal frame members having at least one elongated slot extending therethrough longitudinally along the length thereof, and each of said longitudinal frame members supporting clamps for clamping plastic sheets to be molded; and a pair of transverse frame members disposed in spaced parallel relation to one another and substantially perpendicular to said longitudinal frame members, at least one of said transverse frame members having opposite ends that are slidably disposed through said elongated slots of said longitudinal frame members for supporting said one transverse frame member thereby and for permitting selective sliding movement of said one transverse frame member within said elongated slots for varying the spacing between said transverse frame members, said transverse frame members supporting clamps for clamping plastic sheets to be molded.

2. An adjustable clamping frame for use in a vacuum forming machine according to claim 1, wherein each said longitudinal frame member has two elongated slots.

3. An adjustable clamping frame for use in a vacuum forming machine according to claim 1, wherein at least one said transverse frame member comprises two transverse beams, and further comprising means for disposing said transverse beams in fixed parallel relation to one another.

4. An adjustable clamping frame for use in a vacuum forming machine according to claim 1, and further comprising:

track guides attached to each said longitudinal frame member, a clamping frame support structure for securing the adjustable clamping frame to the vacuum forming machine, said clamping frame support structure having channels extending parallel to said transverse frame members for receiving said track guides, and wherein said longitudinal frame members are slidably secured to said clamping frame support structure by the retention of said track guides in said channels for slidable movement of said longitudinal frame members in a direction parallel to said transverse frame members.

5. An adjustable clamping frame for use in a vacuum forming machine according to claim 4, further comprising means on said track guides for securing said longitudinal frame members in a fixed position relative to said clamping frame support member.

6. An adjustable clamping frame for use in a vacuum forming machine according to claim 1, wherein said one transverse frame member can be slidably removed from said elongated slot by rotating said one transverse frame member about one of its said ends without moving said longitudinal frame members.

7. An adjustable clamping frame for use in a vacuum forming machine according to claim 1, further comprising clamp support members for supporting said clamps on said transverse frame members in a common plane with said clamps of said longitudinal frame members.

8. An adjustable clamping frame for use in a vacuum forming machine according to claim 7, wherein said clamp support members are slidably attached to said transverse frame members.

9. An adjustable clamping frame for use in a vacuum forming machine according to claim 1, wherein two transverse frame members are disposed in spaced parallel relation to one another and substantially perpendicular to said longitudinal frame members, each said transverse frame member having opposite ends that are slidably disposed through said elongated slots of said longitudinal frame members for supporting each said transverse frame member thereby and for permitting selective sliding movement of each said transverse frame member within said elongated slots for varying the spacing between said transverse frame members, each said transverse frame member supporting clamps for clamping plastic sheets to be molded.

10. An adjustable clamping frame for use in a vacuum forming machine according to claim 9, wherein one said transverse frame member is disposed in separate said elongated slots with respect to other said transverse frame member.

11. An adjustable clamping frame for use in a vacuum forming machine according to claim 1, further comprising means adjacent at least one said opposite end of said one transverse frame member for securing said one transverse frame member in a fixed longitudinal position relative to said longitudinal frame members.

12. An adjustable clamping frame for use in a vacuum forming machine according to claim 11, wherein said securing means comprises means slidably attached to said one transverse frame member for selective gripping engagement with opposite sides of one said longitudinal frame member, thereby preventing sliding movement of said one transverse frame member longitudinally within said elongated slot of said one longitudinal frame member.

13. An adjustable clamping frame for use in a vacuum forming machine according to claim 12, said securing means comprises:

two plates slidably attached to said one transverse frame member at said opposite sides of said one longitudinal frame member, and means for urging said plates toward one another to sandwich said one longitudinal frame member between said plates.

14. An adjustable clamping frame for use in a vacuum forming machine according to claim 13, wherein said urging means comprises a fastener extending between said plates for selectively exerting a compressive force to urge said plates into said one longitudinal frame member.

15. An adjustable clamping frame for use in a vacuum forming machine according to claim 14, wherein:

said one transverse frame member comprises two transverse beams, and wherein said plates of said sectoring means have two openings for receiving said transverse frame member therethrough, said plates disposing said transverse beams in fixed parallel relation to one another.

* * * * *